United States Patent [19]
Dickson et al.

[11] Patent Number: 5,915,830
[45] Date of Patent: Jun. 29, 1999

[54] LIGHT-TUBE RUNNING BOARD LIGHTING

[75] Inventors: Floyd R. Dickson, Huntsville, Canada;
Donald P. Chevalier, Armada, Mich.;
Mark Daley-Fell, Orillia, Canada

[73] Assignee: Algonquin Industries International, Inc., Huntsville, Canada

[21] Appl. No.: 08/985,146

[22] Filed: Dec. 4, 1997

[51] Int. Cl.⁶ ..................................................... B60Q 1/24
[52] U.S. Cl. ........................... 362/495; 362/511; 362/559
[58] Field of Search .................................... 362/495, 511, 362/559, 551

[56] References Cited

U.S. PATENT DOCUMENTS

| Re. 34,275 | 6/1993 | Ramsey | 362/81 |
|---|---|---|---|
| 2,561,756 | 7/1951 | Shook | 362/495 |
| 4,271,458 | 6/1981 | George, Jr. | 362/236 |
| 4,463,962 | 8/1984 | Snyder | 280/164 R |
| 4,544,991 | 10/1985 | Gorsuch | 362/81 |
| 4,557,494 | 12/1985 | Elwell | 280/164 R |
| 4,819,136 | 4/1989 | Ramsey | 362/81 |
| 4,947,293 | 8/1990 | Johnson et al. | 362/32 |
| 4,965,704 | 10/1990 | Osborne, Sr. | 362/81 |
| 4,985,810 | 1/1991 | Ramsey | 362/81 |
| 5,132,883 | 7/1992 | La Lumandier | 362/81 |
| 5,193,829 | 3/1993 | Holloway et al. | 280/163 |
| 5,257,847 | 11/1993 | Yonehara | 296/151 |
| 5,450,299 | 9/1995 | Lepre | 362/222 X |
| 5,613,762 | 3/1997 | Agabekov | 362/240 |

*Primary Examiner*—Stephen Husar

[57] ABSTRACT

A running board light assembly is provided having a light source emitting light into a light tube extending along the length of a running board. The light tube casts light directly and uniformly upon a stepping surface of the running board and upon a ground surface below the running board, without directing excessive glare or light into the eyes of the user.

18 Claims, 2 Drawing Sheets

LIGHT-TUBE RUNNING BOARD LIGHTING

BACKGROUND OF THE INVENTION

FIELD OF THE INVENTION

The present invention relates to lights for a running board of a vehicle and, more particularly, to a light tube for directly and uniformly lighting a stepping surface of the running board and a ground surface below the running board.

BACKGROUND AND SUMMARY OF THE INVENTION

Vehicle running boards customarily provide an intermediate step to aid in the entry or exit of the vehicle. These running boards typically extend from the rear of the front wheel well to either the end of the front doors or to the front of the rear wheel well. An example of such a running board can be seen in U.S. Pat. No. 5,382,035.

Lighting assemblies for illuminating vehicle running boards have previously been associated with running boards for both decorative and safety purposes. Typically, such lighting assemblies employ standard incandescent bulbs and lenses to illuminate the running board from either end of the running board. This method causes increased glare to be cast upon the running board, and also causes light to shine in the user's eyes.

Another example of a typical lighting assembly employs a strip of small incandescent bulbs to cast light upon the running board. However, this method does not allow for easy replacement of expired bulbs, nor does it provide for both ground lighting and step lighting from a single light source.

It is therefore desirable to provide a single lighting assembly capable of lighting a stepping surface of a running board, in addition to a ground surface below the running board. It is further desirable to provide a lighting assembly capable of lighting the stepping surface of the running board while minimizing glare and stray light, which may enter the eyes of the user.

According to the preferred embodiment of the present invention, a running board light assembly is provided having a light source emitting light into a light tube extending along the length of a running board. This method allows the light from the light tube to be cast directly and uniformly upon the stepping surface of the running board to improve safety and aesthetics. The light from the light tube may also be cast upon the ground below the running board by simply bending the end of the light tube downward or by tapping into the light source.

Further areas of applicability of the present invention will become apparent from the detailed description provided hereinafter. It should be understood however that the detailed description and specific examples, while indicating the preferred embodiment of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
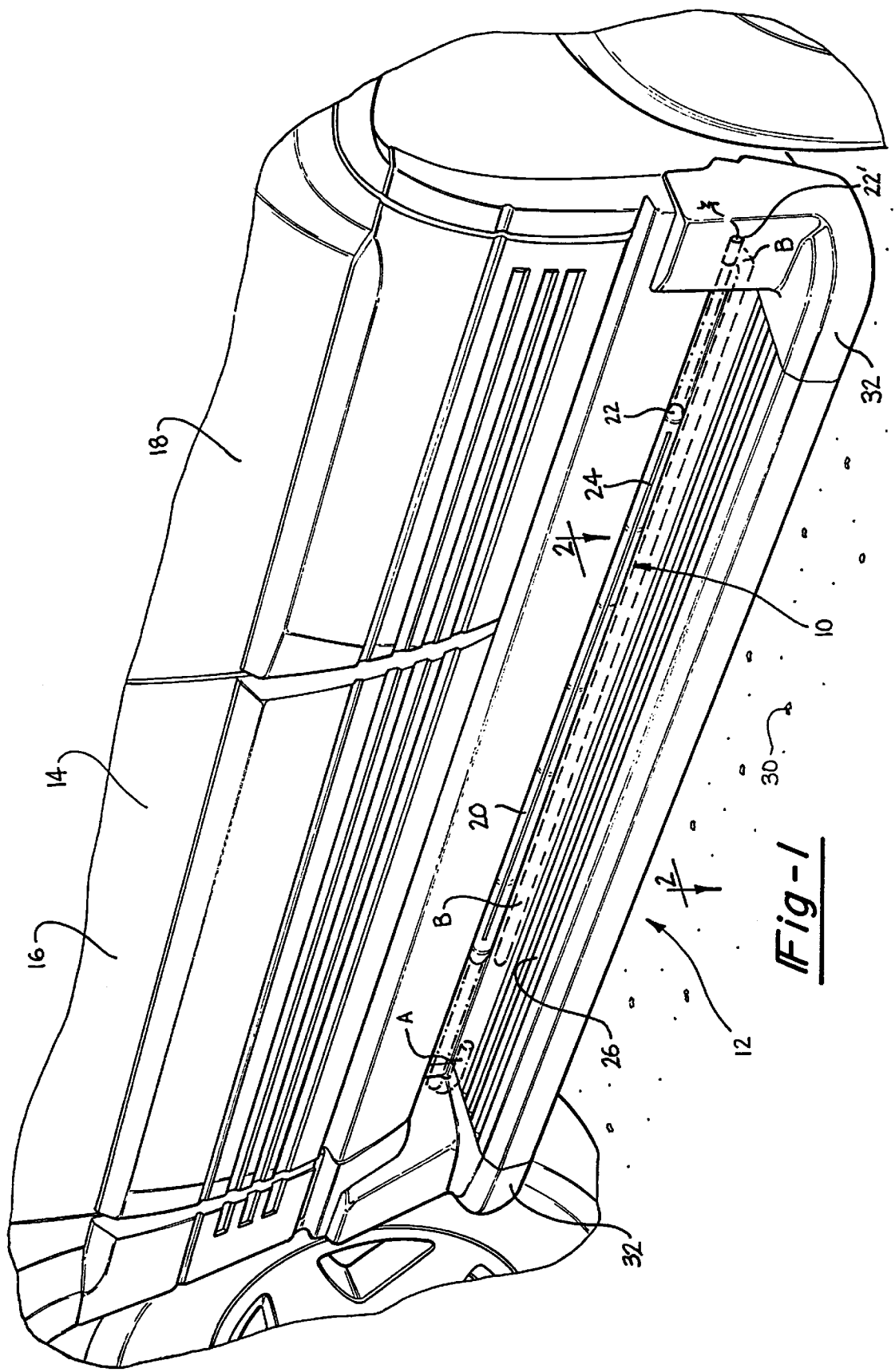
FIG. 1 is a perspective view of the lighting assembly of the present invention attached to a running board of a vehicle.

Referring to FIG. 1, a running board light assembly 10 in accordance with the teachings of the present invention is shown attached to a running board 12 of a vehicle 14. Running board light assembly 10 is adaptable to be attached to a variety of different vehicles including trucks and vans, among others. Running board light assembly 10 is designed to extend longitudinally from generally the front of a front door 16 to either the end of front door 16 (two-door vehicles) or the rear of a rear door 18 (four-door vehicles). It is anticipated that running board light assembly 10 can extend the entire length of running board 12 or may be coupled with other lighting assemblies for varying aesthetic effects.

Figure 2:
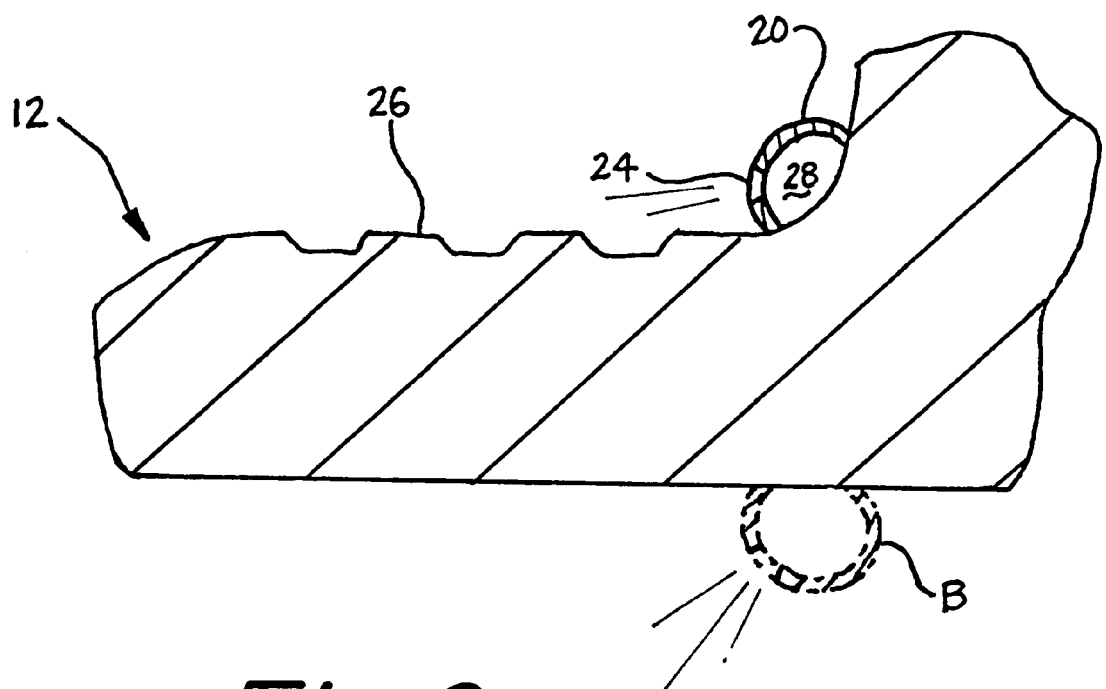
FIG. 2 is a partial cross-sectional view taken along line 2—2 of FIG. 1.

Still referring to FIG. 1, running board light assembly 10 includes a light tube 20 and a light source 22. Light tube 20 is preferably made of a hard acrylic material. However, soft acrylic and fiber-optic material have also been found to possess favorable qualities. As best seen in FIG. 2, light tube 20 includes a translucent or transparent outer portion 24 along its length. Translucent or transparent outer portion 24 allows light transmitted through light tube 20 by light source 22 to be directly and uniformly cast upon a stepping surface 26 of running board 12.

It is anticipated that running board light assembly 10 may be fastened to running board 12 after running board 12 is attached to vehicle 14. On the other hand, running board light assembly 10 may be integrated into the design and manufacture of running board 12 to provide an improved aesthetic value.

Light source 22 of running board light assembly 10 is preferably a single incandescent bulb disposed on an end of light tube 20. However, other common light sources, such as light emitting diodes (LED) or halogen bulbs, may be used. Referring to FIGS. 1 and 2, light source 22 is installed in an end of light tube 20 such that light source 22 is in communication with an interior volume 28 of light tube 20. Interior volume 28 carries the light and reflects it through translucent or transparent outer portion 24.

Using this method, various advantages are realized. First, the transmitting of light through interior volume 28 allows the light to be more efficiently directed over stepping surface 26. Therefore, only a single light source is required to illuminate an entire area of running board 12. Second, the ground 30 beneath running board 12 may be illuminated by directing an end of light tube 20 downward, as shown in phantom as Option A in FIG. 1. Similarly, light source 22 may be tapped to provide light along the ground 30 below running board 12, as shown as Option B in FIGS. 1 (hidden) and 2 (in phantom). The lighting of the ground in this manner allows for improved safety and aesthetic value. Third, the use of translucent or transparent outer portion 24 minimizes glare and directs light away from the eyes of the user, thereby allowing easier entry and exit of the vehicle. Fourth, the present invention allows a light source 22' to be disposed in an end-cap 32, as shown in phantom in FIG. 1, or other feature of running board 12 to minimize the environmental effects on light source 22'.

It is anticipated that running board light assembly 10 may be used in various applications, such as to illuminate rear bumper steps, trailer platforms, or similar stepping surfaces.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lighting assembly for a running board of a vehicle, comprising:

at least one light tube extending along at least a portion of the running board; and at least one light source for emitting light into said at least one light tube, whereby said at least one light tube directs a first portion of said light directly and uniformly over a stepping surface of the running board, said light tube directing a second portion of said light directly and uniformly over a ground surface below the vehicle.

2. The lighting assembly according to claim 1 further comprising:

an outer portion disposed in said at least one light tube for minimizing glare and directing said light away from the eyes of a user.

3. The lighting assembly according to claim 2 wherein said outer portion is translucent.

4. The lighting assembly according to claim 2 wherein said outer portion is transparent.

5. The lighting assembly according to claim 1 wherein an end of said at least one light tube is bent downward with respect to the vehicle for directing said second portion of said light directly and uniformly over said ground surface below the vehicle.

6. The lighting assembly according to claim 1 wherein said at least one light source includes an incandescent bulb.

7. The lighting assembly according to claim 1 wherein said at least one light source includes a halogen bulb.

8. The lighting assembly according to claim 1 wherein said at least one light source include a light emitting diode (LED).

9. The lighting assembly according to claim 1 wherein said at least one light tube is a hard acrylic light tube.

10. The lighting assembly according to claim 1 wherein said at least one light tube is a soft acrylic light tube.

11. The lighting assembly according to claim 1 wherein said at least one light tube is a fiber-optic light tube.

12. A running board lighting assembly for a vehicle, comprising:

a running board;

at least one light tube extending along at least a portion of said running board; and at least one light source for emitting light into said at least one light tube, whereby said at least one light tube directs a first portion of said light directly and uniformly over a stepping surface of said running board, said light tube directing a second portion of said light directly and uniformly over a ground surface below the vehicle.

13. The running board lighting assembly according to claim 12 further comprising:

a translucent portion disposed in said at least one light tube for minimizing glare and directing said light away from the eyes of a user.

14. The running board lighting assembly according to claim 12 further comprising:

at least one cavity within said running board for encapsulating said at least one light source, whereby said at least one cavity secures and protects said at least one light source.

15. The running board lighting assembly according to claim 12 wherein an end of said at least one light tube is bent downward with respect to the vehicle for directing said second portion of said light directly and uniformly over said ground surface below the vehicle.

16. A running board lighting assembly for a vehicle, comprising:

a running board having at least one cavity;

at least one light tube extending along at least a portion of said running board;

an outer portion disposed in said at least one light tube; and at least one light source for emitting light into said at least one light tube, said at least one light source being disposed in said at least one cavity of said running board, whereby said at least one light tube directs said light directly and uniformly over a stepping surface of said running board and a ground surface below said running board.

17. The lighting assembly according to claim 16 wherein said outer portion is translucent.

18. The lighting assembly according to claim 16 wherein said outer portion is transparent.

* * * * *